United States Patent
Yang et al.

(10) Patent No.: US 7,525,620 B2
(45) Date of Patent: Apr. 28, 2009

(54) STRUCTURE OF AN OPTICAL COMPENSATED BEND NEMATIC LIQUID CRYSTAL DISPLAY PANEL

(75) Inventors: Kei-Hsiung Yang, Taoyuan (TW);
Chien-Huang Liao, Hsinchu (TW);
Hao-Ming Chang, Hsinchu (TW);
Yen-Ting Chen, Taipei (TW)

(73) Assignee: Hannstar Display Corporation, Taipei (TW)

( * ) Notice: Subject to any disclaimer, the term of this patent is extended or adjusted under 35 U.S.C. 154(b) by 407 days.

(21) Appl. No.: 11/397,120

(22) Filed: Apr. 3, 2006

(65) Prior Publication Data
US 2006/0187395 A1   Aug. 24, 2006

Related U.S. Application Data

(62) Division of application No. 10/673,016, filed on Sep. 25, 2003, now Pat. No. 7,046,329.

(30) Foreign Application Priority Data
Feb. 27, 2003   (TW) .............................. 92104328 A

(51) Int. Cl.
G02F 1/1337 (2006.01)
(52) U.S. Cl. ..................................... 349/127
(58) Field of Classification Search ......... 349/117–119, 349/177–181, 86–94, 124–136, 191
See application file for complete search history.

(56) References Cited

U.S. PATENT DOCUMENTS

| | | | |
|---|---|---|---|
| 4,796,979 A * | 1/1989 | Tsuboyama | 349/129 |
| 6,014,194 A | 1/2000 | Kuo et al. | |
| 6,034,756 A | 3/2000 | Yuan et al. | |
| 6,339,459 B1 * | 1/2002 | Ichikawa et al. | 349/95 |
| 6,671,025 B1 * | 12/2003 | Ikeda et al. | 349/156 |
| 7,046,329 B2 * | 5/2006 | Yang et al. | 349/187 |
| 7,218,367 B2 * | 5/2007 | Umeda et al. | 349/119 |
| 2003/0193637 A1 | 10/2003 | Mi et al. | |

* cited by examiner

Primary Examiner—Dung T. Nguyen
(74) Attorney, Agent, or Firm—Thomas, Kayden, Horstemeyer & Risley

(57) ABSTRACT

A structure of an optical compensated bend nematic liquid crystal display panel is disclosed. In one embodiment, the structure includes i) a thin film transistor array substrate, wherein a first alignment layer is formed on a surface of the thin film transistor array substrate and a plurality of first spacers are disposed on the surface of the thin film transistor array substrate, ii) an opposite substrate corresponding to the thin film transistor array substrate, wherein a second alignment layer is formed on a surface of the opposite substrate and a plurality of second spacers are disposed on the surface of the opposite substrate and iii) an isolation layer disposed between the thin film transistor array substrate and the opposite substrate, wherein the isolation layer is made of a plurality of polymers with side chains of high carbon number.

16 Claims, 6 Drawing Sheets

STRUCTURE OF AN OPTICAL COMPENSATED BEND NEMATIC LIQUID CRYSTAL DISPLAY PANEL

RELATED APPLICATIONS

This application is a divisional application, and claims the benefit under 35 U.S.C. §120 of U.S. application Ser. No. 10/673,016, filed Sep. 25, 2003, now U.S. Pat. No. 7,046,329 the full disclosure of which is incorporated herein by reference.

BACKGROUND OF THE INVENTION

1. Field of Invention

The present invention relates to a method for manufacturing a liquid crystal display panel and a structure thereof. More particularly, the present invention relates to a method for manufacturing an optical compensated bend nematic liquid crystal display panel and a structure thereof.

2. Description of the Related Technology

Liquid crystal display (LCD) has so many advantages, including high picture quality, small volume, light weight, low driving voltage and low power consumption, that LCDs are widely applied in electronic products such as medium or small-sized portable televisions, mobile phones, videos, notebooks, monitors for desktop computers and projection-type televisions. Therefore, as time goes by, LCDs gradually replace present cathode ray tube (CRT) monitors.

For competing with the CRT monitors, LCDs are nowadays developed towards wide viewing angle and quick response speed. The presently developed LCDs with this trend include TN+film, multi-domain vertical alignment (MVA), in-plane switch (IPS) and optically compensated bend (OCB) LCDs. As far as TN+film, multi-domain vertical alignment (MVA) and in-plane switch (IPS) LCDs are concerned, these LCDs all have the feature of wide viewing angle and can be normally manufactured. However, all these LCDs suffer from the problem of slow response speed. In contrast, as far as optically compensated bend (OCB) LCDs are concerned, it is deemed the main stream of future LCDs because which possesses both the advantages of wide viewing angle and quick response speed.

Reference is made to FIGS. 1A-1C, which are schematic, cross-sectional views of a conventional optically compensated bend (OCB) LCD illustrating how a conventional optically compensated bend (OCB) LCD work. In the conventional optically compensated bend (OCB) LCD, plural liquid crystal molecules 13 are disposed in a space between the thin film transistor array substrate 11 and the opposite substrate 12. There are two alignment layers (not shown on FIGS. 1A-1C) respectively formed on the opposite surfaces of the thin film transistor array substrate 11 and the opposite substrate 12 so that, for the liquid crystal molecules 131 and 132, there is a pre-tilt angle between the liquid crystal molecules 131 and 132 and the adjacent substrates 11 and 12. As shown in FIG. 1A, before the optically compensated bend (OCB) LCD works, the arrangements of the liquid crystal molecules 13 are in a splay state. Only after the arrangements of the liquid crystal molecules 13 are converted from the splay state to a bend state (as shown in FIG. 1B), the optically compensated bend (OCB) LCD can just be ready to work. That is, before the conventional optically compensated bend (OCB) LCD is ready to work, it takes time to warm up to convert the arrangements of the liquid crystal molecules 13 from the splay state to the bend state. Thereafter, as shown in FIG. 1C, by applying voltages on the thin film transistor array substrate 11 and the opposite substrate 12 to produce an electrical field therebetween, the liquid crystal molecules 13 starts to rotate to make the conventional optically compensated bend (OCB) LCD work.

Although the conventional optically compensated bend (OCB) LCD possesses both the advantages of wide viewing angle and quick response speed, it takes a lot of time, e.g. from several seconds to several minutes, to warm up LCD. Besides, the liquid crystal molecules in bend state are not thoroughly stable, the arrangements of the liquid crystal molecules are still easily affected by external causes, such as electrical field or temperature. Accordingly, there is a need for the conventional optically compensated bend (OCB) LCD to be improved.

SUMMARY OF CERTAIN INVENTIVE ASPECTS

One aspect of the present invention provides an optical compensated bend nematic liquid crystal display panel and a structure thereof, wherein the warm-up procedure thereof is omitted.

Another aspect of the present invention provides a method for manufacturing an optical compensated bend nematic liquid crystal display panel is described. First, a surface of a first glass substrate having a plurality of first spacers disposed thereon, wherein a first alignment layer is formed on the surface of the first glass substrate, is provided. Then, a mixture consisting essentially of a plurality of liquid crystal molecules and a plurality of monomers with long side chains, of which carbon number is over 7, is coated on the surface of the first glass substrate. Thereafter, the mixture is cured by UV irradiation and the monomers are transferred into polymers to form an isolation layer on top of the mixture. Next, a surface of a second glass substrate having a plurality of second spacers disposed thereon, wherein a second alignment layer is formed on the surface of the second glass substrate, is provided. Finally, the first glass substrate and the second glass substrate are aligned and assembled.

Another aspect of the present invention provides a structure of an optical compensated bend nematic liquid crystal display panel is described. The optical compensated bend nematic liquid crystal display panel includes a thin film transistor array substrate, an opposite substrate corresponding to the thin film transistor array substrate, and an isolation layer disposed between the thin film transistor array substrate and the opposite substrate. A first alignment layer is formed on a surface of the thin film transistor array substrate and a plurality of first spacers are disposed on the surface of the thin film transistor array substrate. A second alignment layer is formed on a surface of the opposite substrate and a plurality of second spacers are disposed on the surface of the opposite substrate. The isolation layer is made of a plurality of polymers with side chains of high carbon number

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF CERTAIN INVENTIVE EMBODIMENTS

Figure 1A:
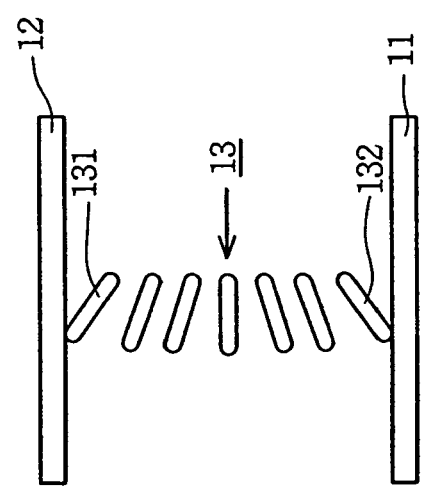
FIGS. 1A-1C are schematic, cross-sectional views of a conventional optically compensated bend (OCB) LCD illustrating how a conventional optically compensated bend (OCB) LCD work.
Figure 1B:
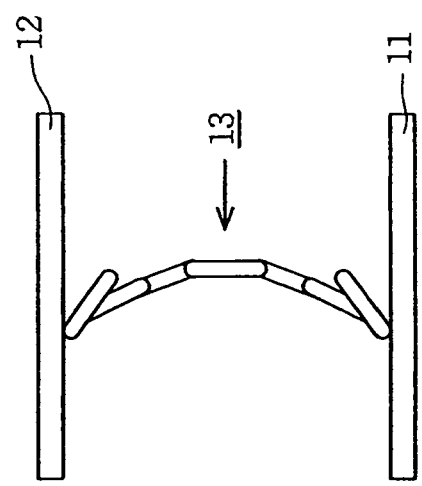
Figure 1C:
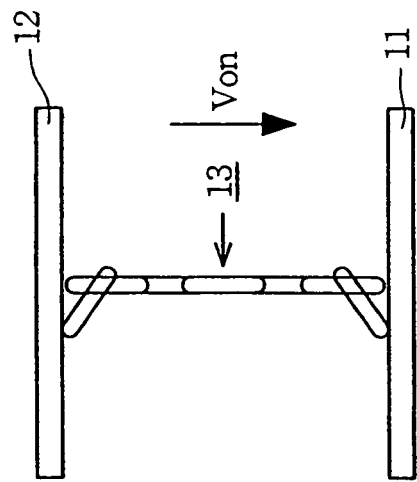

Reference will now be made in detail to embodiments of the invention, examples of which are illustrated in the accompanying drawings. Wherever possible, the same reference numbers are used in the drawings and the description to refer to the same or like parts.

Figure 2A:
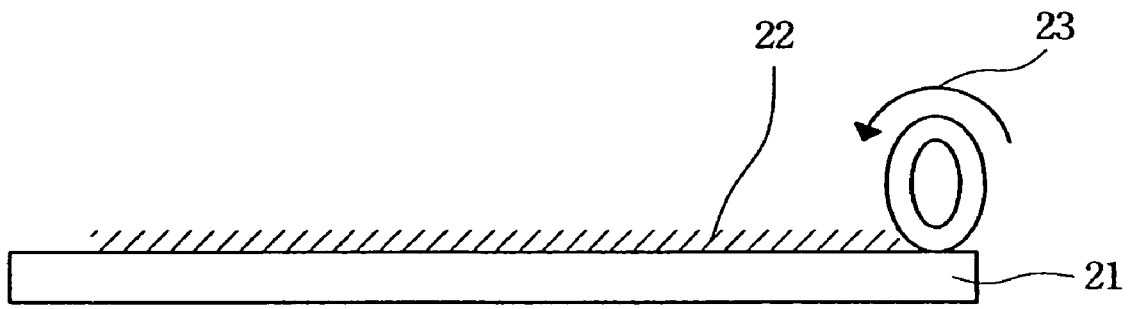
FIGS. 2A-2G are schematic, cross-sectional views illustrating manufacturing for an optically compensated bend nematic liquid crystal display in accordance with the present invention.

Reference are made to FIGS. 2A-2G, which are schematic, cross-sectional views illustrating manufacturing for an optically compensated bend nematic liquid crystal display in accordance with one embodiment of the present invention. First, as shown in FIG. 2A, a first glass substrate 21 is provided. A first alignment layer 22 is formed on a surface of the first glass substrate 21 in advance. For example, the first alignment layer 22 can be formed by means of rubbing 23 a polyimide film coated on the surface of the first glass substrate 21.

Figure 2B:

In FIG. 2B, a mixture 24 consisting essentially of plural liquid crystal molecules, plural first monomers and plural second monomers on the surface of the first glass substrate 21, wherein a carbon number of side chains of the second monomers is over 7. The mixture 24 can be coated on the surface of the first glass substrate 21 by means of printing.

Figure 2C:
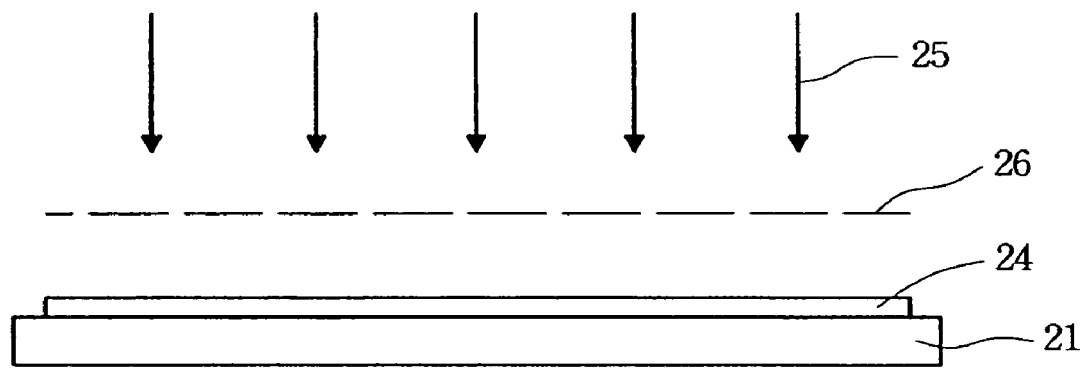
Figure 2D:
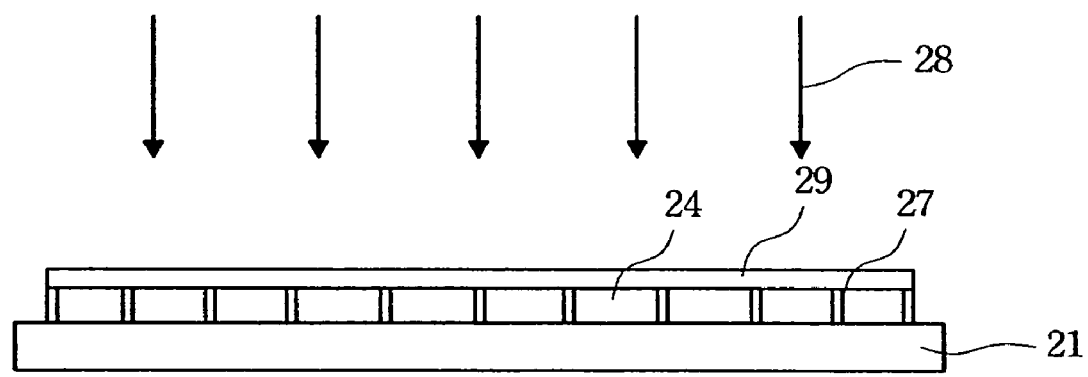

In FIG. 2C, the first glass substrate 21 is irradiated with a first UV 25 through a mask 26 to polymerize the first monomers inside the mixture 24 for forming plural first spacers 27 (as shown in FIG. 2D) on the surface of the first glass substrate 21.

In FIG. 2D, the first glass substrate 21 is irradiated with a second UV 28 to polymerize the second monomers inside the mixture 24 for forming an isolation layer 29 on top of the mixture 24. In one embodiment, a thickness of the isolation layer 29 is arranged from about 0.1 to about 10 micrometers. After the first monomers and the second monomers inside the mixture 24 are both polymerized by being respectively irradiated with first UV 25 and second UV 28, the mixture 24 remains only the liquid crystal molecules. In fact, the mixture 24 further includes first initiator for initiating polymerization of the first monomers when the first glass substrate 21 is irradiated with first UV 25, and second initiator for initiating polymerization of the second monomers when the first glass substrate 21 is irradiated with second UV 28.

Figure 2E:
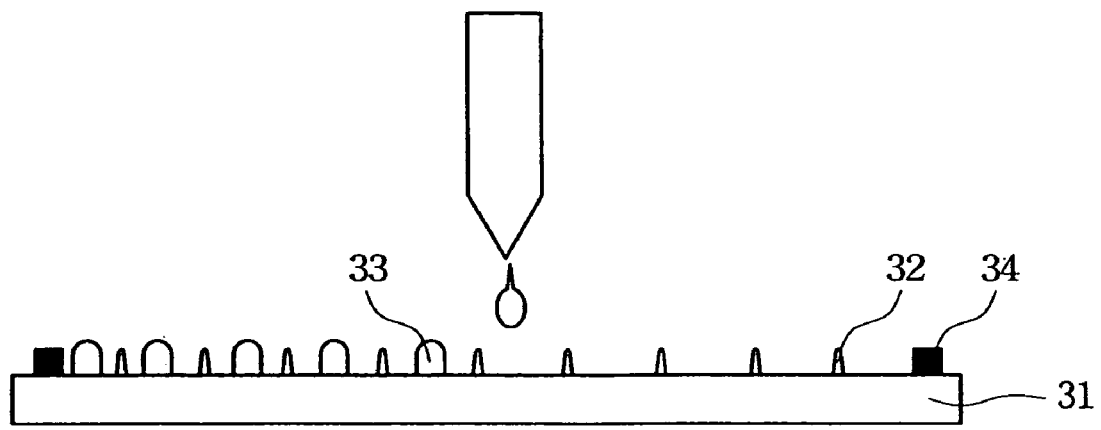

In FIG. 2E, a second glass substrate 31 is provided first. Then, a plural second spacers 32 such as photo spacers are formed on a surface of the second glass substrate 31. Next, a second alignment layer (not shown in FIG. 2E) is formed on the surface of the second glass substrate 31. Thereafter, the liquid crystal molecules are filled into the spaces between adjacent second spacers 32 by means of one drop fill method. Then, a periphery of the surface of the second glass substrate 31 is coated with a sealing adhesive 24.

Figure 2F:
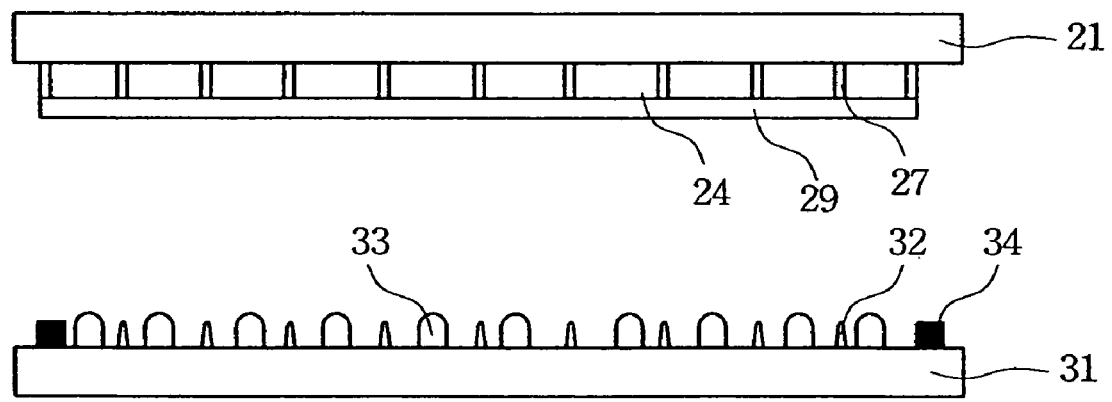
Figure 2G:
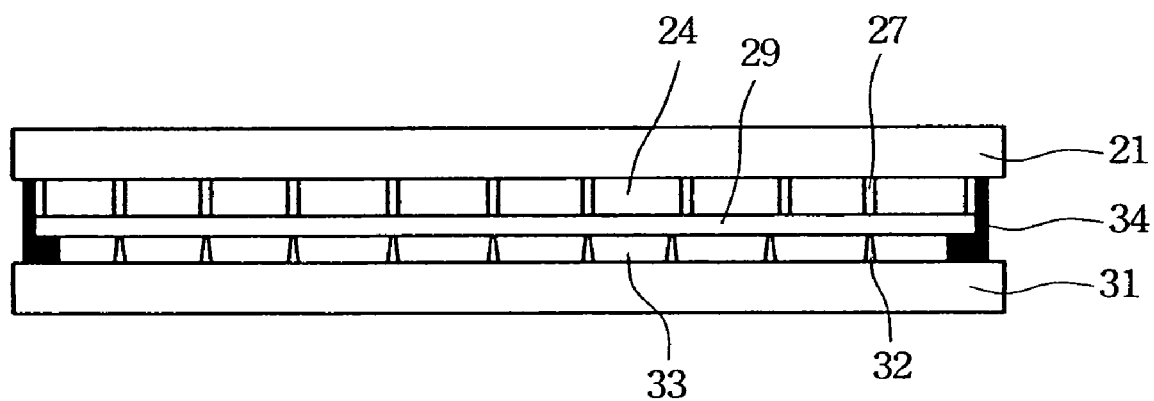

Finally, as shown in FIG. 2F, the surface of the first glass substrate 21 and the surface of the second glass substrate 31 are aligned and assembled. The sealing adhesive 24 is also cured. The manufactured optically compensated bend nematic liquid crystal display in accordance with one embodiment of the present invention is shown in FIG. 2G.

Figure 3:
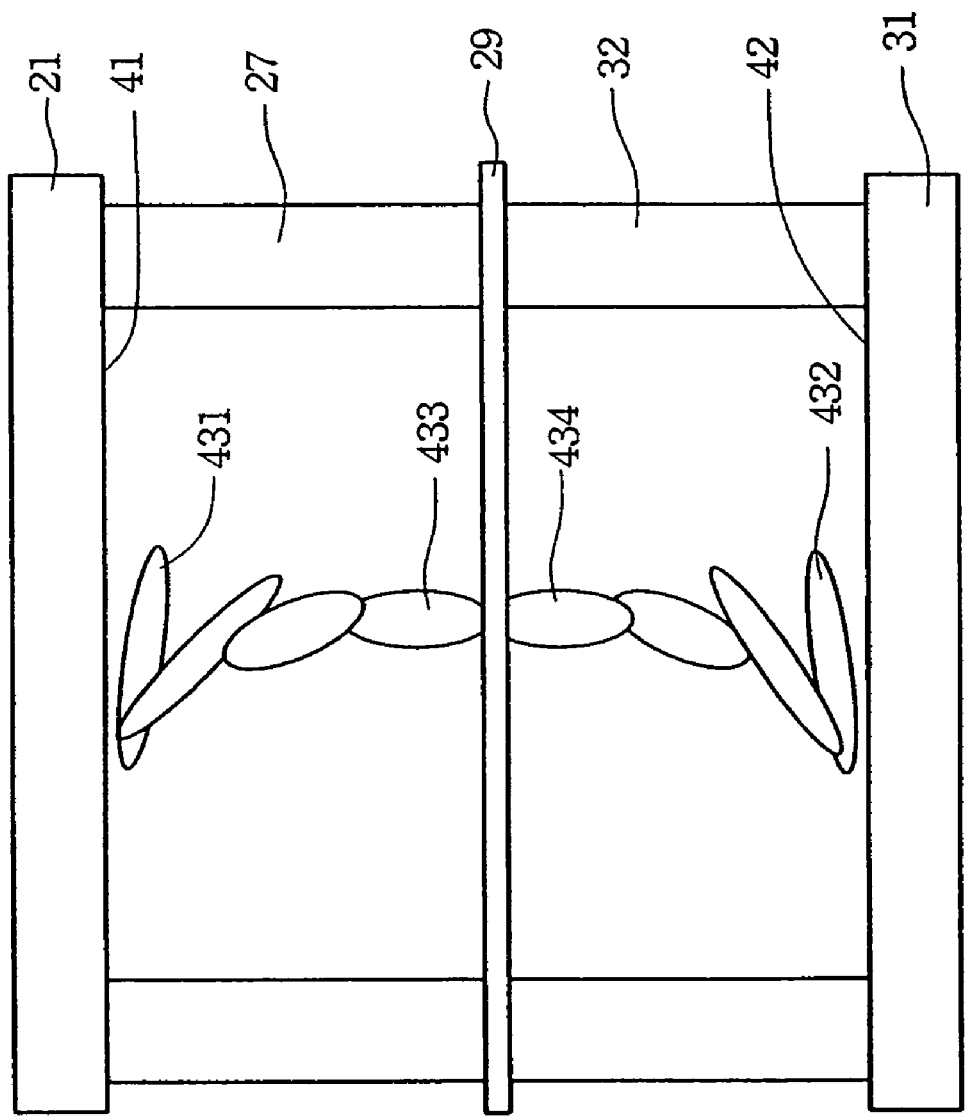
FIG. 3 is a schematic, partial cross-sectional view illustrating a structure of an optically compensated bend nematic liquid crystal display in accordance with the present invention.

FIG. 3 is a schematic, partial cross-sectional view illustrating a structure of an optically compensated bend nematic liquid crystal display in accordance with one embodiment of the present invention. Because the isolation layer 29 is formed by polymerizing the second monomers of long side chains, e.g. a carbon number thereof is over 7, the liquid crystal molecules 433, 434 adjacent to the isolation layer 29 is maintained vertically with respect to the isolation layer 29. Certainly, the liquid crystal molecule 431 adjacent to the first alignment layer 41 and the liquid crystal molecule 432 adjacent to the second alignment layer 42 are maintained to arrange oppositely to each other. In other words, the liquid crystal molecules encompassed inside the optically compensated bend nematic liquid crystal display are originally maintained in a bend state. Compared with the convention optically compensated bend (OCB) LCD, the optically compensated bend nematic liquid crystal display in accordance with one embodiment of the present invention does not have to additionally include a warm-up step to convert the arrangements of the liquid crystal molecules from the splay state to the bend state.

According to one embodiment of the present invention, the first spacers 27 and the second spacers 32 can be formed by means of other methods in addition to the above-mentioned steps. For example, the first spacers 27 and the second spacers 32 can both be photo spacers. That is, the first spacers 27 and the second spacers 32 can be formed on the first glass substrate 21 and the second glass substrate 31 by means of photolithography and etching technique in advance. In this case, the mixture 24 coated on the first glass substrate 21 does not include the first monomers for forming the first spacers 27. The mixture 24 merely consists of the liquid crystal molecules and the second monomers for forming the isolation layer. The step of FIG. 2C is omitted as well.

According to one embodiment of the present invention, the first spacers and the isolation layer can be formed on a thin film transistor array substrate, and then the thin film transistor array substrate is aligned and assembled with an opposite substrate. Alternatively, the first spacers and the isolation layer can be formed on an opposite substrate first, and then the opposite substrate is aligned and assembled with a thin film transistor array substrate.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A structure of a liquid crystal display panel, the structure comprising:

a thin film transistor array substrate, wherein a first alignment layer is formed on a surface of the thin film transistor array substrate and a plurality of first spacers are disposed on the surface of the thin film transistor array substrate;

an opposite substrate opposite to the thin film transistor array substrate, wherein a second alignment layer is formed on a surface of the opposite substrate and a plurality of second spacers are disposed on the surface of the opposite substrate;

a plurality of liquid crystal molecules disposed between the thin film transistor array substrate and the opposite substrate; and means for orienting the liquid crystal molecules vertically with respect to a surface thereof, the means disposed between the thin film transistor array substrate and the opposite substrate, wherein the liquid crystal molecules are disposed between the first alignment layer and the means for orientating said liquid crystal molecules as well as between the second alignment layer and the means for orientating said liquid crystal molecules.

2. The structure according to claim 1, wherein a thickness of the orienting means is arranged from about 0.1 to about 10 micrometers.

3. The structure according to claim 1, wherein the orienting means is made of polymers with side chains of carbon number over 7.

4. The structure according to claim 1, wherein the liquid crystal molecule adjacent to the first alignment layer and the liquid crystal molecule adjacent to the second alignment layer are arranged oppositely to each other.

5. A structure of a liquid crystal display panel, the structure comprising:
- a thin film transistor array substrate, wherein a first alignment layer is formed on a surface of the thin film transistor array substrate and a plurality of first spacers are disposed on the surface of the thin film transistor array substrate;
- an opposite substrate corresponding to the thin film transistor array substrate, wherein a second alignment layer is formed on a surface of the opposite substrate and a plurality of second spacers are disposed on the surface of the opposite substrate;
- a plurality of liquid crystal molecules disposed between the thin film transistor array substrate and the opposite substrate; and
- an isolation layer disposed between the thin film transistor array substrate and the opposite substrate, wherein the isolation layer is made of a plurality of polymers with side chains of high carbon number, wherein the liquid crystal molecules are disposed between the isolation layer and the first alignment layer as well as between the isolation layer and the second alignment layer.

6. The structure according to claim 5, wherein the first spacers are photo spacers.

7. The structure according to claim 5, wherein the second spacers are photo spacers.

8. The structure according to claim 5, wherein a plurality of liquid crystal molecules are disposed between the thin film transistor array substrate and the opposite substrate.

9. The structure according to claim 8, wherein the liquid crystal molecule adjacent to the first alignment layer and the liquid crystal molecule adjacent to the second alignment layer are arranged oppositely to each other.

10. The structure according to claim 8, wherein a periphery of the thin film transistor array substrate and a periphery the opposite substrate comprise a sealing adhesive for encompassing the liquid crystal molecules inside the an optical compensated bend nematic liquid crystal display panel.

11. The structure according to claim 5, wherein a thickness of the isolation layer is arranged from about 0.1 to about 10 micrometers.

12. The structure according to claim 5, wherein a carbon number of side chains of the polymers is over 7.

13. A structure of a liquid crystal display panel, the structure comprising:
- a thin film transistor array substrate, wherein a first alignment layer is formed on a surface of the thin film transistor array substrate and a plurality of first spacers are disposed on the surface of the thin film transistor array substrate;
- an opposite substrate opposite to the thin film transistor array substrate, wherein a second alignment layer is formed on a surface of the opposite substrate and a plurality of second spacers are disposed on the surface of the opposite substrate;
- a plurality of liquid crystal molecules disposed between the thin film transistor array substrate and the opposite substrate; and
- a member configured to orient the liquid crystal molecules vertically with respect to a surface thereof, the member disposed between the thin film transistor array substrate and the opposite substrate, wherein the liquid crystal molecules are disposed between the first alignment layer and the member configured to orient the liquid crystal molecules as well as between the second alignment layer and the member configured to orient the liquid crystal molecules.

14. The structure according to claim 13, wherein a thickness of the member is in the range of about 0.1 to about 10 micrometers.

15. The structure according to claim 13, wherein the member is made of polymers.

16. The structure according to claim 15, wherein the polymers have side chains of carbon number over 7.

* * * * *